United States Patent [19]

Ogata et al.

[11] Patent Number: 4,638,472
[45] Date of Patent: Jan. 20, 1987

[54] INFORMATION RECORDING SYSTEM AND METHOD FOR USING ALTERNATIVE RECORD AREA IN WRITING AND READING OF DATA ON OPTICAL DISK

[75] Inventors: Mikito Ogata; Masahito Mori, both of Odawara; Takashi Doi, Hadano; Michio Miyazaki; Takafumi Oka, both of Odawara, all of Japan

[73] Assignee: Hitachi, Ltd., Tokyo, Japan

[21] Appl. No.: 587,961

[22] Filed: Mar. 9, 1984

[30] Foreign Application Priority Data

Mar. 11, 1983 [JP] Japan .................................. 58-39213

[51] Int. Cl.$^4$ ....................... G11B 20/12; G11B 20/18
[52] U.S. Cl. ........................................ 369/54; 360/25; 360/31; 360/53
[58] Field of Search ...................... 369/54, 58; 360/53, 360/25, 31; 371/38

[56] References Cited

U.S. PATENT DOCUMENTS

| | | | |
|---|---|---|---|
| 4,145,758 | 3/1979 | Drexler et al. | 365/215 |
| 4,202,018 | 5/1980 | Stockham, Jr. | 360/53 |
| 4,375,664 | 3/1983 | Kim | 371/38 |
| 4,453,250 | 6/1984 | Hoshimi et al. | 371/38 |
| 4,458,349 | 7/1984 | Aichelmann, Jr. et al. | 371/38 |
| 4,491,882 | 1/1985 | Fujiie | 360/53 |
| 4,519,058 | 5/1985 | Tsurushima et al. | 369/54 |

FOREIGN PATENT DOCUMENTS 0105814  7/1982  Japan ..................................... 360/53

Primary Examiner—Vincent P. Canney
Assistant Examiner—Hoa T. Nguyen
Attorney, Agent, or Firm—Antonelli, Terry & Wands

[57] ABSTRACT

An information recording method and system for writing information onto a recording medium. If an error area is detected in a check of the information read out of the medium after writing, the information is rewritten onto an alternative area on the recording medium using a buffer memory while the information in the error area is kept valid. Loss time accessing the alternative area is eliminated until the error checking and correction in the error checking and correction circuit is not available for the information read out of the error area through a reading circuit.

8 Claims, 6 Drawing Figures

INFORMATION RECORDING SYSTEM AND METHOD FOR USING ALTERNATIVE RECORD AREA IN WRITING AND READING OF DATA ON OPTICAL DISK

The present invention relates to an information recording method and system, and more particularly to an information recording and reproducing method and system which is applicable to a rotating type information storage apparatus having an alternative area associated with a record error area on a recording medium.

A magnetic tape apparatus and a magnetic disk apparatus are representative types of auxiliary storage apparatus in a computer system. In the magnetic tape apparatus, recorded information is checked by a read-after-write method when the information is written, and if a record error is detected, the recorded information in the record error area is erased and the information is rewritten starting from an area following the record error area.

On the other hand, in the magnetic disk apparatus, if a record error is detected by the read check immediately after the write operation, the information is rewritten into an alternative area associated with the record error area. The data in the record error area is invalidated and if the readout of the data in the record error area is subsequently requested, the alternative area is accessed.

Recently, an optical disk which utilizes a laser beam has been developed as a large capacity information storage apparatus. The optical disk apparatus uses a rotary disk having a metal film on a surface thereof as an information storage medium, and in a write operation, a laser beam modulated with the information is irradiated to form pits in the metal film, and in a read operation, a laser beam which is sufficiently strong to fuse the metal film is irradiated on the disk and the presence or absence of the pit is determined based on the magnitude of the reflected light. Accordingly, in the optical disk apparatus, unlike the magnetic storage apparatus, it is not possible to rewrite the information in the previously recorded area. Further, since the information is recorded by forming the pits in the metal film by irradiating the disk with a laser beam, a variation easily occurs in the pits in the metal film depending on the time of the recording due to factors such as degradation of the laser beam source, a change of the condition of the recording medium due to temperature and a change of the condition of the metal film. For example, a record area which can be correctly read by one apparatus may not always be correctly read by the same apparatus because of aging of the apparatus or by another apparatus.

Accordingly, in the optical disk apparatus, in order to secure a margin for a variation of the reproducing condition, a more severe discrimination criterion than that of a conventional read operation is applied to the read check for the recorded information, and if a record error area which does not meet the criterion is detected, correct information must be rewritten into an alternative area. However, if the access method of the conventional magnetic disk apparatus in which the error area is invalidated and the alternative area is to be accessed is employed in the optical disk apparatus, the frequency of access from the normal record area to the alternative area is high and a long access time is required.

It is an object of the present invention to provide an information recording and reproducing system which is effective for use with an information recording medium like an optical disk in which a read error is apt to occur intermittently.

In order to achieve the above object, in accordance with the present invention, there is provided an information recording system for recording information on a recording medium, thereafter reading out the recorded information, and if a record error area which does not meet a predetermined criterion is detected, rewriting the information for the record error area in another area on the recording medium with the information in the record error area being left valid. Thus, the information for the record error area is rewritten in the alternative area while the information in the record error area is kept valid on the recording medium. As a result, if the information read from the record error area can be correctly read out by an Error Checking and Correction (ECC) technique, for example, the alternative area need not be accessed and the time loss is reduced.

Even if the reproduction of the information from the record error area is unsuccessful, the correct information stored in the alternative area is accessed so that the necessary information is correctly read out.

The above and further objects and novel features of the invention will more fully appear from the following detailed description when the same is read in connection with the accompanying drawings.

The present invention will be apparent from the following detailed description taken in conjunction with the accompanying drawings, in which.

One embodiment of the present invention is now explained in detail with reference to the drawings.

Figure 1:
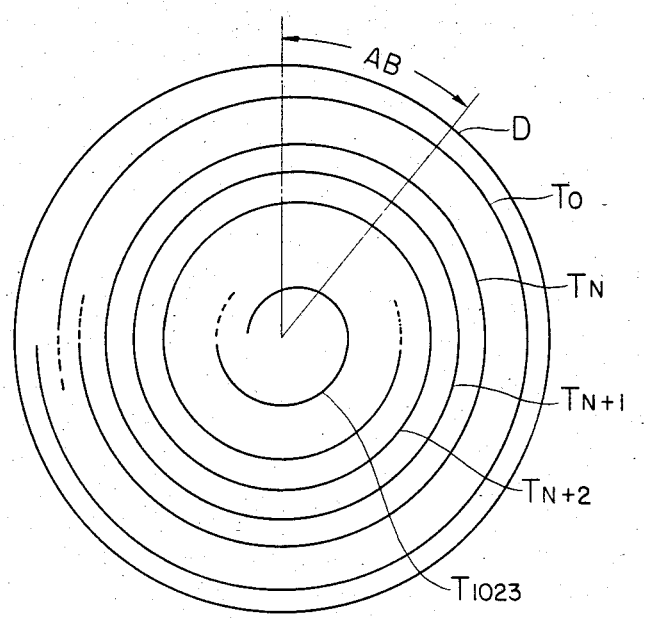
FIG. 1 illustrates record areas on an optical disk.

FIG. 1 schematically shows an information record format of an optical disk. 1024 concentric of spiral tracks are formed on each surface of an optical disk D. In FIG. 1, the tracks are spiral and track numbers $T_0$-$T_{1023}$ are designated thereto from the outermost one to the innermost one.

Figure 2:
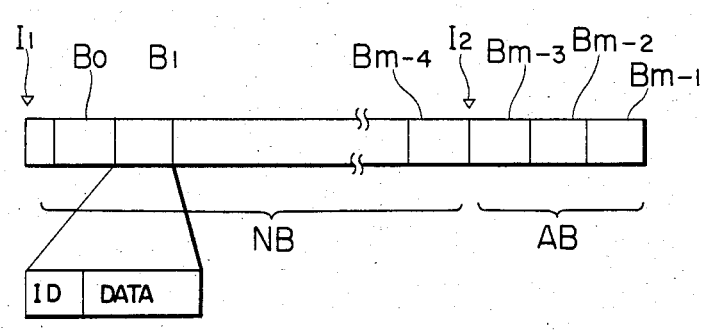
FIG. 2 shows a track on the optical disk.

FIG. 2 shows a record format in one track. Each track comprises m blocks $B_0$-$B_{m-1}$ corresponding to sectors and each block includes an ID field and a data field. The ID field primarily contains information representing physical positions (track numbers and a block number) of the block and the data field contains, for example, 512-byte data and associated information such as error correction codes. In FIG. 2, the blocks $B_0$ to $B_{m-4}$ are original record areas in which normal user data is stored. These blocks are hereinafter referred to as a normal block NB. The four blocks $B_{m-3}$ to $B_{m-1}$ following to the block $B_{m-4}$ are alternative blocks which are used as alternative blocks for record error blocks of the normal block in the track. These blocks are hereinafter referred to as an alternative block AB.

Figure 3:
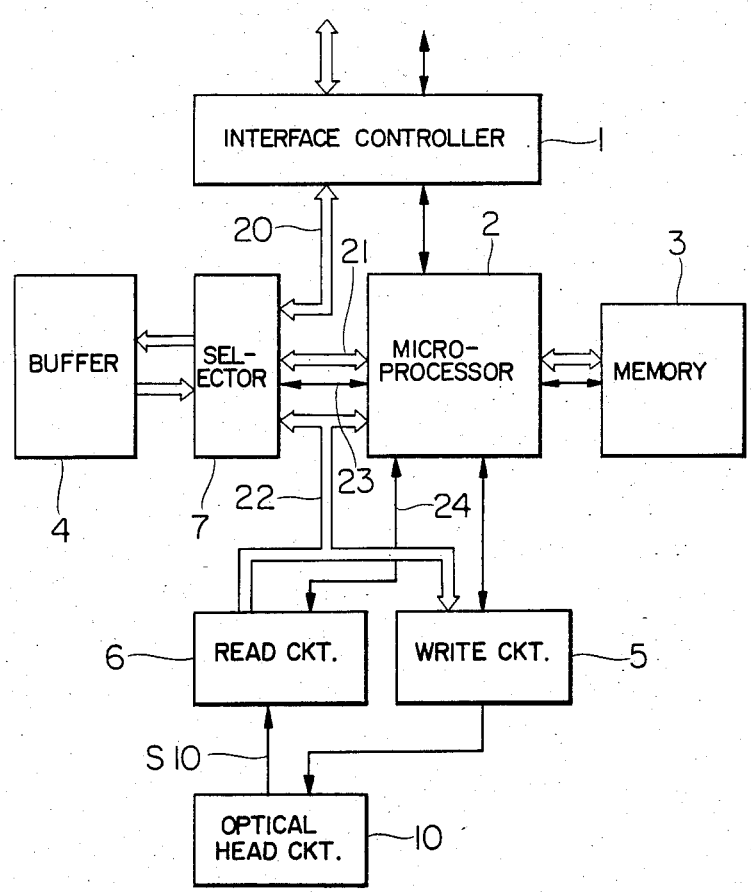
FIG. 3 is a block diagram of a control unit in one embodiment of the present invention.

FIG. 3 shows a configuration of an optical disk controller which controls writing and reading of information to and from the normal block NB and the alternative block AB. Numeral 1 denotes an interface controller for controlling transmission of signals to and from a higher level unit (CPU channel), numeral 2 denotes a microprocessor for operating elements of the optical disk controller in a predetermined sequence in accordance with commands from the higher level unit, numeral 3 denotes a memory for storing microinstructions which define control operations by the microprocessor 2, numeral 4 denotes a buffer memory having a capacity which is at least one track of data of the optical disk, numeral 5 denotes a write circuit which modulates data read from the buffer memory 4 and supplies it to an optical head circuit 10, numeral 6 denotes a read circuit which demodulates an output signal $S_{10}$ from the optical head circuit 10 and transfers it to the buffer memory 4, and numeral 7 denotes a selector for selecting an input/output bus of the buffer memory 4. It selects an interface bus 20, a processor bus 21 or a R/W circuit bus 22 in accordance with a microinstruction 23 supplied from the microprocessor 2 and connects the selected bus to the buffer memory 4.

Figure 4:
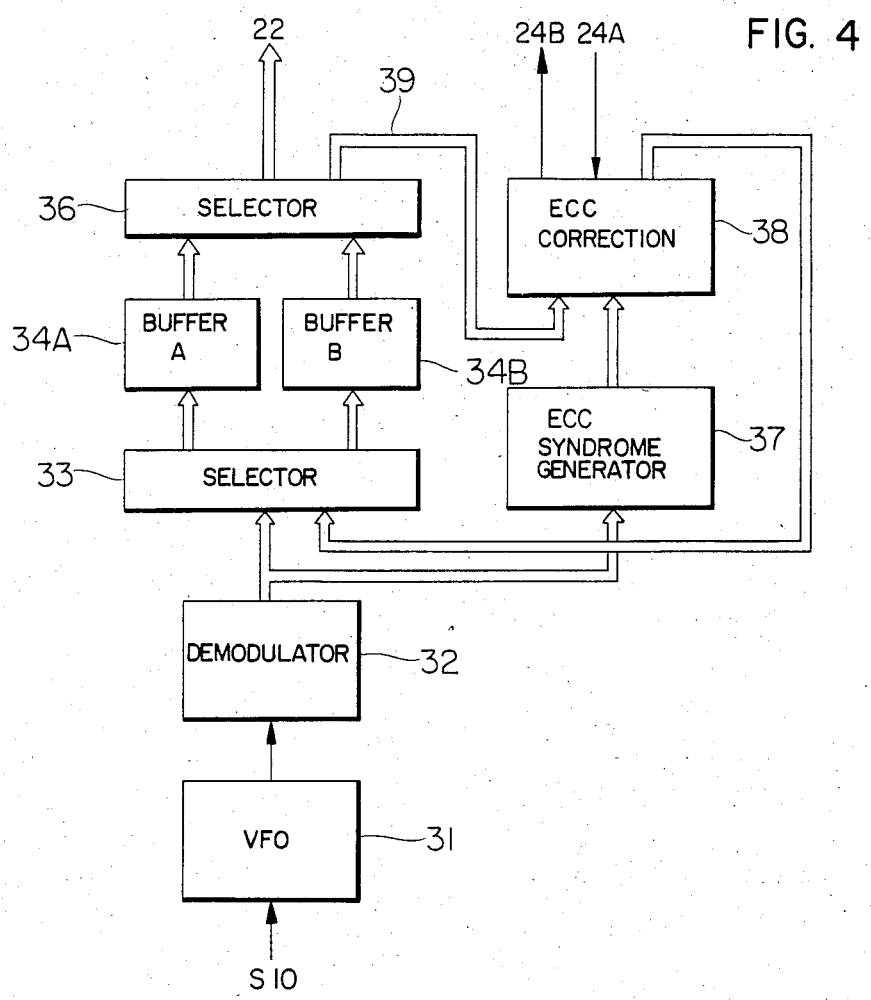
FIG. 4 is a block diagram of a read circuit 6 shown in FIG. 3.

FIG. 4 shows a block diagram of the read circuit 6 shown in FIG. 3.

The information recorded on the optical disk D is detected by irradiating the disk with a weak laser beam focused at a track position and converting to an electrical signal a change in the intensity of the reflected light due to a presence or absence of the pit. The detected signal is supplied to a VFO (variable frequency oscillator) circuit 31 as an output signal $S_{10}$ of the optical head circuit 10. The output of the VFO circuit 31 is demodulated by a demodulator 32 and an output thereof is supplied to one of the buffer memories 34A and 34B through a selector 33, from which it is sent out to a signal line 22 or 39 through a selector 36. The buffer memories 34A and 34B each has a memory capacity of one block of data, as shown in FIG. 2, and they are used as a two-plane buffer for the one-track buffer memory 4, as will be explained later.

The output of the demodulator 32, which is supplied to the buffer memory 34A (or 34B), also is transferred to an ECC syndrome generator 37 which generates an ECC syndrome. When one block of data of the optical disk is written into the buffer memory 34A (or 34B), an ECC correction circuit 38 reads in that data and the ECC syndrome from the circuit 37 and corrects the data by ECC as required and rewrites the corrected data into the buffer memory 34A (or 34B) through the selector 33.

In the present invention, the ECC correction circuit 38 is operated in one of the following modes depending on a control signal 24A from the microprocessor 2.

The first mode is executed in a normal read operation. The ECC correction circuit 38 corrects the data from the buffer memory 34A (or 34B) by the ECC and the corrected data is supplied to the microprocessor 2 through a signal line 24B. In this mode, when the circuit 38 corrects the one block of read data by the ECC and transfers the corrected data to the buffer memory, the signal line 24B assumes a low level, and when the read data contains a large error which cannot be corrected by the ECC and the circuit 38 cannot transfer the correct data to the buffer memory, the signal line 24B assumes a high level.

The second mode is executed in a read operation for a write error check. The ECC correction circuit 38 does not correct the data from the buffer memory 34A (or 34B). By using the syndrome output, the signal line 24B again assumes the high level when the data contains an error and assumes the low level when the data contains no error.

While the data of one of the buffer memories 34A, and 34B, for example, the buffer memory 34A is outputted to the signal line 39 and corrected, the new data from the next block on the optical disk is written into the other buffer memory 34B and the previous data of the buffer 34B is outputted to the signal line 22. While the data of the buffer memory 34B is corrected, the data of the next block on the optical disk is sent to the buffer memory 34A and the corrected block data is outputted to the signal line 22. As a result, the data read from the optical disk is sent to the one-track buffer memory without interruption.

The write operation and the read operation of the information to and from the optical disk are carried out under the control of the above control system in the following manner.

[Write Operation]

The data is written into the disk D one track at a time by buffering the data received from the higher level unit into the one-track buffer memory 4 through the interface controller 1.

(1) The one track of data stored in the buffer memory 4 is supplied to the optical head circuit 10 through the write circuit 5, one block at a time, and sequentially written into the normal block NB on a predetermined track of the optical disk D.

(2) The ECC correction circuit 38 is set to the second mode by the control signal 24A and the data on the normal block NB written in the step (1) is sequentially read. The ECC correction circuit 38 sets the signal line 24B to the high level when an error is detected in one of the blocks.

(3) The microprocessor 2 detects the write error block from the status of the signal line 24B and memorizes the position of the error block. After the read operation of the one track data, the microprocessor 2 supplies the data for that write error block to the write circuit 5 to sequentially write it into the alternative block AB of the disk.

(4) The control signal 24A selects the second mode and the data of the alternative block AB written in the step (3) is sequentially read.

(5) If an error block is detected by the signal line 24B in the step (4), the microprocessor 2 repeats the steps (3) and (4) and rewrites the alternative data in a vacant area of the alternative block.

Through those steps, one track of correct data is written into the normal block NB or the alternative block AB. In this case, the writing of the data into the alternative block is effected on the basis of the error decision mode when the ECC correction circuit 38 is operated in the second mode and the data of the normal block for the error block is not erased but retained in the optical disk. Accordingly, the normal block which was determined as the error block and the alternative block of which was set has a possibility to be correctly read by the ECC correction in the next read operation.

Taking this possibility into cionsideration, the normal information read operation from the optical disk is carried out in the following manner.

[Read Operation]

(1) The ECC correction circuit 38 is set to the first mode by the control signal 24A, and the data is read from a specified track on the optical disk and stored in the one-track buffer memory 4.

(2) For the block which caused the signal line 24B to assume the high level in the step (1), the corresponding alternative block is searched from the buffer memory 4 and it is transferred to the higher level unit in place of the error block.

Figure 5:
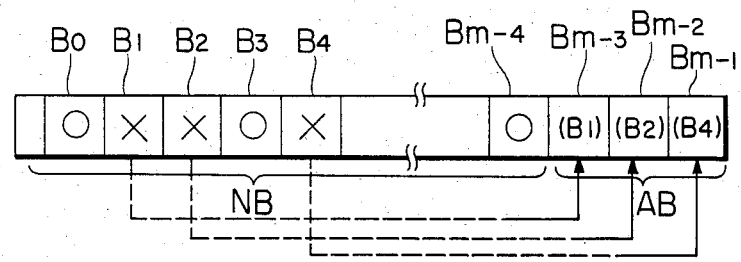
FIGS. 5A and 5B illustrate occurrence of error areas in an information write mode and a subsequent read mode in accordance with the present invention.
Figure 5:
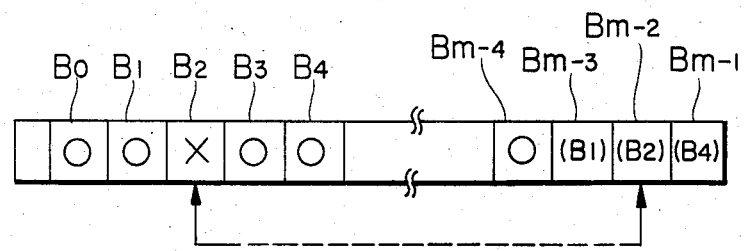

The write operation and the read operation are diagrammatically shown in FIGS. 5A and 5B.

In FIG. 5A, it is assumed that the data is written into the blocks $B_0$-$B_{m-4}$ in one track. It is assumed that error blocks are detected as shown in FIG. 5A in the read-after-write check. Symbols x indicate the error blocks and symbols o indicate normal blocks. In the write operation of the present invention, alternative areas are allotted to those error blocks and the data is rewritten into the alternative areas. In the illustrated example, a copy of the block $B_1$ is rewritten into the alternative block $B_{m-3}$, a copy of the block $B_2$ is rewritten into the block $B_{m-2}$, and a copy of the block $B_4$ is rewritten into the block $B_{m-1}$. Since the error check is made in the second mode, a possibility remains that some of the blocks $B_1$, $B_2$ and $B_4$ which were determined as the error blocks and the copies of which were rewritten in the alternative areas may be correctly read by the ECC.

The read operation for the same track is explained. It is assumed that the error block is detected in the read operation as shown in FIG. 5B. In the read operation, the control line 24A is set in the first mode and the error blocks are corrected by the ECC.

Accordingly, the blocks $B_1$ and $B_4$ in FIG. 5B are now indicated by symbols o because they are corrected by the ECC or they were incidentally determined as the error blocks in the previous read-after-write check. Anyway, the blocks $B_1$ and $B_4$ now read can be used as they are and the substitution by the alternative areas $B_{m-3}$ and $B_{m-1}$ is not necessary. Accordingly, only the block $B_2$ which is still the error block after the ECC correction is substituted by the corresponding alternative block $B_{m-2}$. So long as the blocks $B_1$ and $B_2$ can be read, the alternative blocks $B_{m-3}$ and $B_{m-1}$ are not used and will be used when the blocks $B_1$ and $B_2$ can no longer be read due to aging.

In the above embodiment the error areas are rewritten into the alternative areas block by block and substituted by the alternative areas block by block. However, from the spirit of the present invention, it is not essential to use the alternative areas block by block and the data may be used in a smaller unit (for example, an ECC block unit). While several blocks at the end of the track are allotted to the alternative areas in the above embodiment, the present invention is also applicable to a system in which alternative areas are allotted to a different track from the original track, or a system in which alternative areas are allotted to the end of the original track until data overflows the alternative areas and after the overflow, other alternative areas are allotted to a diffrent track from the original track.

In this type of storage apparatus, the advantage of the present invention that the reliability of the data is assured without increasing the access time is further enhanced.

In the above embodiment, when the alternative area is set, a flag indicating the presence of the alternative area may be set at the beginning of the corresponding normal block. Thus, if an error is detected in the read operation at a normal block having no such flag set, a time loss to search the alternative area is eliminated and the overhead is improved.

When the alternative areas are set in a different track, the access time can be reduced by referring to the flag.

In the above embodiment, the data is checked immediately after the write operation and the alternative area is allocated. Alternatively, the read check and the allocation of the alternative area may be separated from the write operation. For example, after a considerable time has elapsed since the data was written so that the data is degraded such that it can be read after several tries, the alternative area may be set.

As described hereinabove, in accordance with the information recording system of the present invention, the write error check is conducted under a severe criterion and the alternative area is set, and in the read operation, the possibility is left that the information may be read from the area which was determined as the error area and for which the alternative area was set. Accordingly, when a recording medium in which the read error intermittently occurs is used, the frequency of the access to the alternative area is reduced.

We claim:

1. An information recording method for reading information after said information has been written onto a record medium, and if a record error area which does not meet a predetermined criterion is detected, rewriting alternative information for the information of said record error area into a different area on said record medium, characterized by
rewriting the information into said different area while the information of said record error area is kept valid.

2. An information recording method according to claim 1, wherein when the information is rewritten into said different area, an indicia for indicating the presence of the alternative area is recorded in said record error area.

3. An information recording and reproducing method for reading information after said information has been written onto a record medium, and if a record error area which does not meet a predetermined criterion is detected, rewriting alternative information for the information of said record error area into a different area on said record medium while the information in said record error area is kept valid, and in a subsequent information read operation, checking the read information under a different criterion from said predetermined criterion, and accessing the alternative area for an area determined as an error area.

4. An information recording and reproducing method according to claim 3, wherein the information is written together with an error check and correction code in every record area onto the record medium, the check of the read information for preparing the alternative area is made on the read information uncorrected by the error check and correction code, and checks of the read information in the usual read operation are made on the read information corrected by the error check and correction code.

5. An information recording and reproducing method using a recording medium having a plurality of tracks each divided into a plurality of areas comprising the steps of:
(a) writing information provided from a host apparatus on the tracks of the recording medium while excluding from recording at least one vacant area reserved as an alternative area in the recording medium;

(b) reading the recorded information from one of the tracks in the recording medium, and if the information read from a record area has an error which does not meet a predetermined criterion, rewriting the information into an unused alternative area in the one track while the information previously recorded in said record area is kept valid; and (c) reading the information written in several areas of the one track, and if the information read from a record area has an error which does not meet another criterion which is different from the predetermined criterion, providing the corresponding information written in the alternative area on the one track to a host apparatus.

6. An information recording and reproducing method according to claim 5, wherein the information is written with an error check and correction code in every record area onto the record medium, the check of the read information for preparing the alternative area is made on the read information uncorrected by the error check and correction code, and successive checks of the read information are made on the read information corrected by the error check and correction code.

7. An information reproducing system using a recording medium having a plurality of tracks each divided into a plurality of record areas for recording information written with an error check and correction code, each of said tracks including at least one alternative area for recording the information to be recorded in one of said record areas if the information in said record area is detected as having an error which does not meet a predetermined criterion, comprising:

read out means for reading the information from one of the tracks in said recording medium;

data correcting means for correcting the information in respective record areas provided from said read out means by using said error check and correction code and for producing a status signal which indicates the detection of a record area having erroneous information uncorrected by the error check and correction code;

memory means for storing at least one track of information provided from said data correcting means; and output means for outputting the information stored in said memory means by replacing the erroneous information in said record area with the information in said alternative area according to said status signal.

8. An information recording and reproducing method for reading information after said information is written onto a first area of a record medium, comprising the steps of:

rewriting said information onto an alternative area of said record medium under a state of leaving said information on said first area, if a record error is detected in said information read from said first area, reproducing both said information from said first and alternative areas at subsequent readings of said information.

* * * * *